Patented May 10, 1938

2,116,827

UNITED STATES PATENT OFFICE 2,116,827

POLYHYDROXY LEUCO DERIVATIVES OF TRIPHENYLMETHANE AND PROCESSES FOR THEIR PRODUCTION

Zoltán Földi, Budapest, Hungary

No Drawing. Application February 23, 1937, Serial No. 127,318. In Hungary March 4, 1936

10 Claims. (Cl. 260—66)

The preparation of the polyhydroxy derivatives of triphenylmethane has been made subject to several investigations without having led to crystalline or pure forms of these derivatives in general. Up to the present time especially those hexahydroxy derivatives of triphenylmethane were unknown which contain in each of the three benzene rings two hydroxy groups in mutual ortho position. My own experiments have led to the unexpected result that triphenylmethane derivatives containing in each of the three benzene rings in ortho position two hydroxy groups or partially alkylated hydroxy groups, readily crystallize and are consequently obtainable in pure crystalline state.

The main object of my invention is to produce polyhydroxy leuco derivatives of the general formula

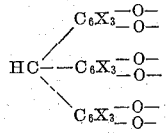

in which formula X represents any member of the group: H, alkyl, sulpho group—the phenolic oxygen atoms being in mutual ortho position on the benzene rings and linked to H or an aliphatic radical—with the restriction that at least one of the phenolic oxygen atoms is linked to a hydrogen atom.

According to my present invention such new products can be prepared by condensing by methods commonly used for the preparation of triphenyl-methanes starting materials which contain in the benzene rings in mutual ortho position only two phenolic oxygen atoms linked either to H or an aliphatic radical with the restriction that at least one of the six phenolic oxygen atoms present in the three benzene rings to be condensed is linked to hydrogen, the benzene rings containing further members of the group: H, alkyl, sulpho group, radicals apt to supply the methane carbon atom of the triphenyl-methane derivative.

Further aims of the invention are disclosed in the following description and claims.

From the synthetic methods usually employed for preparing triphenylmethanes that one is especially suitable which employs as starting material on the one hand catechol aldehyde respectively its mono or dialkyl ether and on the other hand catechol or its alkyl ethers which starting materials may be substituted in their benzene rings also by an alkyl or sulpho group. However, these starting materials are to be assorted in such way that at least one of the starting materials should contain a free phenolic hydroxyl. The methane carbon atom of the triphenylmethanes to be synthesized may be provided also by starting materials in which this particular carbon atom is already linked with two benzene rings; such starting materials are e. g. the tetra-alkoxy benzohydrols. In this case the other starting material is catechol respectively one of its alkyl ethers.

Moreover, the methane carbon atom of the desired triphenylmethane derivatives can be supplied by e. g. a polyhalide of methane such as iodoform, carbon tetrabromide, and so on.

At the preparation of products of the present process acid condensing agents are used in general such as e. g. concentrated sulphuric acid diluted by alcohol or glacial acetic acid or hydrochlorid acid either in form of a concentrated aqueous solution or dissolved in alcohol or glacial acetic acid. Dehydrating salts, e. g. zinc chloride, or similar substances may also be used.

The products of this process are on the one hand valuable intermediates partly for the dyestuff industry partly for the pharmaceutical industry, they themselves have on the other hand valuable therapeutic as e. g. antiseptic properties.

Examples 1. 44 g. of catechol and 30 g. of vanillin are dissolved in 30 cc. of absolute alcohol. To this solution 44 g. of concentrated sulphuric acid, dissolved in 30 cc. of absolute alcohol, are added while shaken and cooled, care being taken that the temperature should not rise above 15° C. After standing for 2½ hours, the mixture is poured into 250 cc. water and extracted with ether. The ethereal extract is washed with water, then with a 10% solution of sodium bisulphite. After the ether has been distilled off, the residue is extracted by a 15% solution of sodium bisulphite. The 3,3',4,4',4''-pentahydroxy-3''-methoxy-triphenylmethane crystallizes in fine granulae, yielding 35–45 g. M. P. about 195–198°. The product can be recrystallized from hot water.

2. 7 g. of catechol aldehyde and 12.4 g. of guaiacol are dissolved in 15 cc. of absolute alcohol and the solution saturated with dry gaseous hydrogen chloride. After standing for several hours, 80 g. of ice and, on cooling and shaking, a 40% sodium hydroxide solution are added until the mixture becomes only slightly acid, tested by Congo strip. Adding a small quantity of zinc dust, the mixture is refluxed. The pale yellow solution thus obtained is extracted with ethyl acetate. The ethyl acetate layer is separated; on evaporation of the solvent a crude residue remains. After recrystallization from 30 cc. of ether, the 3,4,4',4''-tetrahydroxy-3',3''-dimethoxy-triphenylmethane is obtained in colorless homogenous crystals melting at about 197°.

3. 15 g. of vanillin and 25 g. of guaiacol are dissolved in 15 cc. of absolute alcohol and, under cooling and shaking, a solution of 16 cc. of concentrated sulfuric acid in 15 cc. of absolute alcohol is added. After allowing to stand for 12-16 hrs., the mixture is poured into water and the product, thus separated, washed several times with warm water. On recrystallization from hot chloroform, 3,3',3'' - trimethoxy - 4,4',4''-trihydroxy-triphenylmethane in crystals of a pale pink color is obtained. M. P. 128–130°. Yield: 25–30 g. The crystals contain crystal solvent.

4. The preparation is the same as in Example 3, the difference being that the condensation is carried out by employing glacial acetic acid instead of alcohol. The substance obtained this way is identical with the one described in Example 3.

5. 6.9 g. of 2-hydroxy-3-methoxy-toluene and 3.8 g. of vanillin are dissolved in 7.5 cc. of absolute alcohol. Subsequently, under cooling by an ice-salt mixture and agitation, 4 cc. of concentrated sulfuric acid are added. After standing for 2 hours, the mixture is poured on ice. A solid separates which after being washed thoroughly with water becomes dissolved in a small quantity of alcohol, decolorized with sodium bisulphite and poured into water again. The resulting solid is filtered and dried. The dry product crystallizes readily from the 25-fold quantity of warm benzene. The 3,3',3''-trimethoxy-4,4',4''-trihydroxy-5,5' - dimethyl - triphenylmethane, thus obtained, melts at 155°. Yield 80–90%.

6. Starting from 3.8 g. of vanillin and 8.3 g. of 1-propyl-2-hydroxy-3-methoxy-benzene, and by employing the same method described in the foregoing example, 3,3',3''-trimethoxy-4,4',4''-trihydroxy-5,5'-dipropyl triphenylmethane is obtained. The recrystallization is carried out in this case from aqueous alcohol instead of benzene. M. P. 135–138°. Yield: 70–80%.

7. 5 parts of guaiacol and 5 parts of calcium 4-hydroxy - 3 - methoxy-benzaldehyde-5-sulphonate are mixed with 10 parts of a 30–35% absolute alcoholic hydrogen chloride solution. The mixture, after standing for about two days, is diluted with 40 parts of water. The unchanged guaiacol is then removed by extraction with ether. On adding conc. ammonia until alkaline reaction, the calcium salt of the 3,3',3''-trimethoxy-4,4',4''-trihydroxy-triphenylmethane-5-sulphonic acid precipitates. It may be recrystallized from water. Yield: 50–60%.

8. 16.6 g. of 3-ethoxy-4-hydroxy-benzaldehyde and 25 g. of guaiacol are dissolved in 30 cc. of alcohol and, under cooling and shaking, 16 cc. of concentrated sulphuric acid are added. The mixture is kept standing for 1½ hours. The separation of the product, formed by this reaction, is carried out in the way described in Example 5. The substance crystallizes readily from chloroform. M. P. about 130°.

9. 24 g. of 3-methoxy-4-hydroxy-toluene and 15 g. of vanillin are dissolved in 40 cc. of absolute alcohol and under cooling 20 cc. of conc. sulphuric acid added. After standing for 24 hours, the mixture is poured on ice. The precipitate is filtered and, after drying, extracted by petroleum ether. The insoluble part is recrystallized from 500 cc. of benzene. The 2,2',4''-trihydroxy-3,3',3'' - trimethoxy - 5,5' - dimethyl-triphenylmethane is obtained. M. P. 222–226°. It can be purified by recrystallization either from glacial acetic acid or from aqueous acetone.

10. 16 g. of 3,3',4,4'-tetramethoxy-benzohydrol and 6 g. of guaiacol are dissolved in 120 cc. of absolute alcohol containing 15% dry hydrogen chloride, and refluxed. After about 20 minutes 9 g. of freshly fused zinc chloride are added and the boiling continued for 3 hours. After diluting with water until slight turbidity, one extracts the mixture with ether. The ethereal layer is dried with anhydrous sodium sulphate and, subsequently, evaporated. The crystalline residue is mixed with a small quantity of alcohol and, after being kept standing over night, is filtered off. The crystals may be recrystallized from alcohol. M. P. 157–158°. The substance is 3,3',4,4',4''-pentamethoxy-3''-hydroxy - triphenylmethane. On methylation with dimethyl sulphate, 3,3',3'',4,4',4'' - hexamethoxy - triphenylmethane of M. P. 141° is formed.

11. 10 g. of catechol, 11 g. of carbon tetrabromide and 1.4 g. of freshly fused zinc chloride are heated in an oil bath for 5–6 hours at 115–130°. After cooling, the mixture is extracted twice with 75 cc. of ether. The insoluble part is dissolved in 60 cc. of alcohol and 40 cc. of 20% hydrochloric acid; on adding of zinc dust, the mixture is boiled, then filtrated. In order to remove alcohol the filtrate is distilled in vacuo. The remaining solution is extracted thoroughly by ethyl acetate. After the ethyl acetate has been evaporated, the residue is dissolved in 40–60 cc. of hot water. On cooling the 3,3',3'',4,4',4''-hexahydroxy-triphenylmethane crystallizes in colorless or slightly colored crystals. M. P. at about 249°. An aqueous solution develops on addition of alkali a deep green coloration.

In the present specification and claims it is understood by alkyls substituted into phenolic hydroxyls not only the alkyls proper but also alkylenes, such as methylene, cyclically substituted into two vicinal hydroxyls. For instance, one may replace the vanillin in the foregoing examples by piperonal.

What I claim is:—

1. A process for producing new leuco-polyhydroxy-triphenylmethane derivatives, comprising condensing by methods commonly used for the preparation of triphenyl-methanes starting materials comprising aromatic compounds which contain in the benzene rings in mutual ortho position only two phenolic oxygen atoms linked to a member of the group consisting of H and an aliphatic radical with the restriction that at least one of the six phenolic oxygen atoms present in the three benzene rings to be condensed is linked to hydrogen, the benzene rings containing further members of the group consisting of H, alkyl, sulpho and substituted methyl.

2. A process as claimed in claim 1, characterized by using as aromatic starting materials compounds containing only one benzene ring.

3. A process as claimed in claim 1, characterized by using as one of the starting materials a diphenyl methane derivative and as the other starting material a compound containing one benzine ring.

4. A process as claimed in claim 1, characterized by condensing a compound of the type of the protocatechualdehyde with a compound of the catechol type.

5. A process as claimed in claim 1, characterized by condensing a compound of the type of the polyhydroxy-diphenyl-methane with a compound of the catechol type.

6. A triphenylmethane derivative of the general formula:

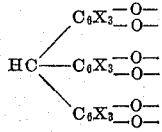

in which formula X represents any member of the group consisting of H, alkyl, and sulpho—the phenolic oxygen atoms being in mutual ortho position on the benzene rings and linked to a member of the group consisting of H and an aliphatic radical—with the restriction that at least one of the phenolic oxygen atoms is linked to a hydrogen atom.

7. A triphenylmethane derivative of the general formula:

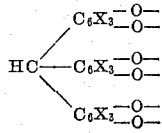

in which formula X represents any member of the group consisting of H, alkyl, and sulpho, the phenolic oxygen atoms being in mutual ortho position on the benzene rings, only two of the six phenolic oxygen atoms being linked to an aliphatic radical.

8. A triphenylmethane derivative of the following formula:

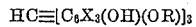

X representing members of the group consisting of H, alkyl, and sulpho; R representing an alkyl group, the OH and OR groups being substituted in mutual ortho position in the benzene rings.

9. A triphenylmethane derivative of the following general formula:

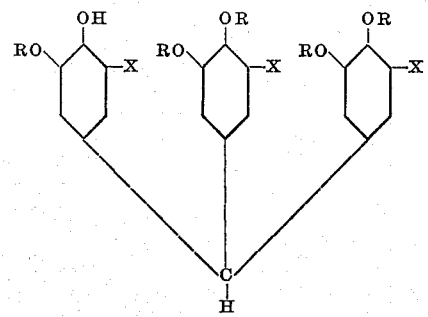

X representing members of the group consisting of H, alkyl, and sulpho, R representing a member of the group consisting of H and an aliphatic radical.

10. A triphenylmethane derivative of the formula:

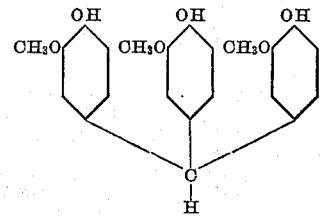

which crystallizes with solvents of crystallization.

ZOLTÁN FÖLDI.